(12) United States Patent
Hahm et al.

(10) Patent No.: US 7,016,150 B2
(45) Date of Patent: Mar. 21, 2006

(54) METHOD AND APPARATUS FOR CLEANING HEAD WITH OVER-DAMPED HARMONIC OSCILLATION

(75) Inventors: Christopher D. Hahm, Roy, UT (US); Marty L. Stout, South Weber, UT (US); Stephanie L. Seaman, Portland, OR (US)

(73) Assignee: Iomega Corporation, San Diego, CA (US)

( * ) Notice: Subject to any disclaimer, the term of this patent is extended or adjusted under 35 U.S.C. 154(b) by 228 days.

(21) Appl. No.: 10/692,641

(22) Filed: Oct. 24, 2003

(65) Prior Publication Data

US 2004/0090707 A1  May 13, 2004

Related U.S. Application Data

(60) Provisional application No. 60/425,928, filed on Nov. 12, 2002.

(51) Int. Cl.
*G11B 5/41* (2006.01)

(52) U.S. Cl. ..................... 360/128; 360/254.7
(58) Field of Classification Search ............. None
See application file for complete search history.

(56) References Cited

U.S. PATENT DOCUMENTS

| | | | |
|---|---|---|---|
| 4,446,547 A * | 5/1984 | Gonzalez ................. 369/74 |
| 5,138,733 A | 8/1992 | Bock ...................... 15/22.1 |
| 5,247,716 A | 9/1993 | Bock ...................... 15/22.1 |
| 5,369,831 A | 12/1994 | Bock ...................... 15/22.1 |
| 6,067,211 A * | 5/2000 | Chliwnyj et al. .......... 360/128 |
| 6,252,739 B1 | 6/2001 | Todd et al. .............. 360/128 |
| 6,252,742 B1 * | 6/2001 | Kameyama .............. 360/237 |
| RE38,390 E * | 1/2004 | Onooka et al. .......... 360/254.7 |
| 6,769,150 B1 * | 8/2004 | Liu et al. ................ 15/21.1 |
| 6,801,394 B1 * | 10/2004 | Fritsch et al. ........... 360/128 |
| 6,867,947 B1 * | 3/2005 | Davis .................... 360/128 |
| 2002/0063993 A1 * | 5/2002 | Hall ...................... 360/128 |
| 2004/0090706 A1 * | 5/2004 | Thomas et al. .......... 360/128 |

OTHER PUBLICATIONS

U.S. Appl. No. 10/293,704 filed Nov. 12, 2002 by inventors Fred C. Thomas III and Christopher D. Hahm.

* cited by examiner

*Primary Examiner*—Jefferson Evans
(74) *Attorney, Agent, or Firm*—James T. Hagler

(57) ABSTRACT

An apparatus has an information storage medium with an information storage surface, and structure operable to effect relative movement of the head and surface within a first zone while maintaining the head adjacent the surface and while using the head to effect at least one of reading information from and writing information to the surface. A head cleaning section includes a cleaning part engageable with the head when the head is in a second zone where the head is spaced from the surface, the structure being operable to effect relative movement of the engaged head and cleaning part in a manner which includes a component of movement that is representative of an applied force subject to a damping influence.

28 Claims, 5 Drawing Sheets

METHOD AND APPARATUS FOR CLEANING HEAD WITH OVER-DAMPED HARMONIC OSCILLATION

This application claims the priority under 35 U.S.C. §119 of provisional application No. 60/425,928 filed Nov. 12, 2002.

TECHNICAL FIELD OF THE INVENTION

This invention relates in general to techniques for increasing the storage density of information stored by a storage medium and, more particularly, to techniques for cleaning a read/write head that transfers information to and from the storage medium.

BACKGROUND OF THE INVENTION

Over the past twenty years, computer technology has evolved very rapidly. One aspect of this evolution has been a progressively growing demand for increased storage capacity in memory devices. In order to provide high storage density at a reasonable cost, one of the most enduring techniques has been to provide a rotatable hard disk that includes a layer of magnetic material, and a read/write head which is supported for movement adjacent the disk.

In arrangements of this type, if the head is exposed to airborne dust, smoke, vapors or other contaminants, these contaminants can progressively build up on the head. Eventually, the buildup becomes sufficient to interfere with the interaction between the head and disk, thereby increasing the error rate until the device will not operate. In order to avoid this problem, most hard disk drives have the disk and head disposed within a sealed enclosure, so that the head and disk are not exposed to any airborne contaminants that may happen to be present externally of the enclosure.

This approach works well where the entire hard disk drive is permanently installed in a computer. In another type of system, however, a hard disk is provided in a removable cartridge, and it is desirable that the cartridge not include the read/write head. In this regard, there are advantages to placing a head stack assembly (HSA) and its support structure within the drive which receives the cartridge, rather than in the cartridge. For example, a typical user will have several removable cartridges for each drive. Thus, in terms of overall system cost, it is cheaper to provide a single head stack assembly and support in the drive, rather than to provide several separate head stack assemblies which are each disposed in a respective one of the many cartridges used with that drive. However, this presents problems in regard to keeping the head clean.

More specifically, in order to permit the head from the drive to access the disk within the cartridge, the cartridge is not provided with a sealed enclosure of the type discussed above. Instead, the cartridge is provided with an opening through which the head of the drive can be inserted into the cartridge. In some cases, a movable shutter is provided to obstruct the opening when the cartridge is not in the drive, but the shutter is open when the cartridge is in the drive. Thus, in either configuration, when the cartridge is in the drive, the opening gives not only the head but also ambient air access to the disk and head. Consequently, any dust, smoke, vapor or other contaminant carried by the ambient air can get inside the cartridge enclosure, and the operational surface of the head can quickly develop a buildup of contaminants.

The effect of this buildup can be ameliorated to some extent by keeping the storage density of the hard disk in the removable cartridge at a relatively low level, in comparison to the levels used for hard disks located within sealed enclosures. However, as mentioned above, the commercial marketplace is exhibiting a strong and progressively increasing demand for high-density storage in a removable cartridge.

A further consideration is that existing high-density read/write heads typically have an operational surface with recesses therein. While it is not too difficult to clean the outermost portions of the operational surface of such a head, it is more difficult to clean other portions of the surface which are within the shallow recesses. As contamination collects in the recesses, it can significantly degrade system operation.

SUMMARY OF THE INVENTION

From the foregoing, it may be appreciated that a need has arisen for a method and apparatus for effectively and efficiently cleaning a head which moves relative to an information storage surface, and which effects transfers of information to or from that surface. According to the present invention, a method and apparatus are provided to address this need, and relate to operation of an apparatus which includes an information storage medium having an information storage surface, structure which includes a head and can effect a transfer of information with respect to the surface, and a cleaning part. The method and apparatus involve: effecting relative movement of the head and surface within first and second zones that are mutually exclusive, the head being spaced from the surface when in the second zone; maintaining the head adjacent the surface and using the head to effect at least one of reading information from and writing information to the surface during relative movement of the head and surface within the first zone; causing the cleaning part to engage the head when the head is in the second zone and while effecting relative movement of the head and cleaning part in a manner which includes a component of movement representative of an applied force subject to a damping influence.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
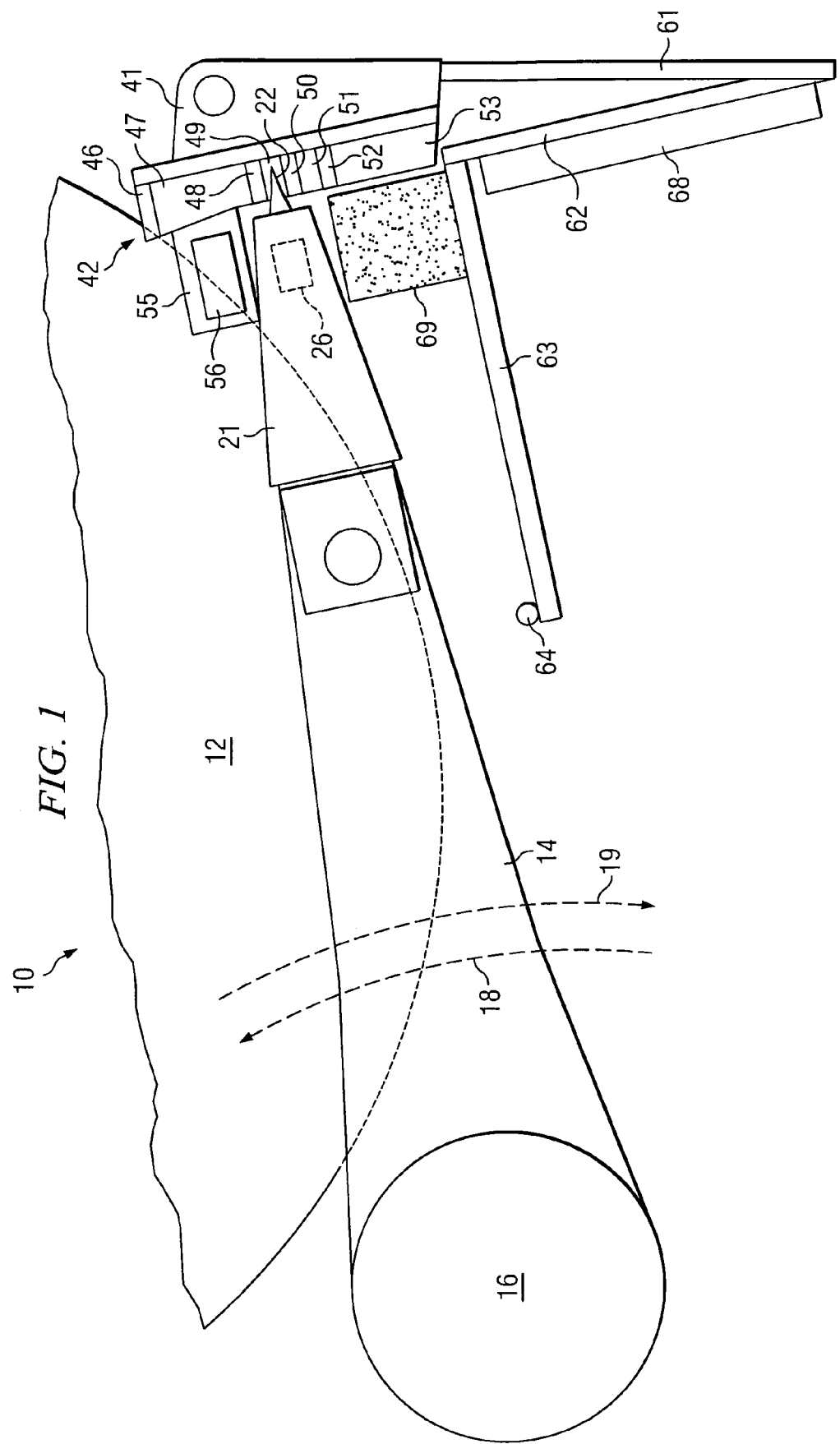
FIG. 1 is a diagrammatic fragmentary top view of an apparatus which is part of a disk drive that embodies aspects of the present invention.

FIG. 1 is a diagrammatic fragmentary top view of an apparatus which is part of a disk drive 10 and which embodies aspects of the present invention. The disk drive 10 includes a rotably supported hard disk 12 which has a magnetic surface on an upper side thereof. The hard disk 12 is rotated by a not-illustrated motor of a known type. An arm 14 is fixedly supported on a pivot axle 16, and the pivot axle 16 can be pivoted by a not-illustrated actuator of a known type. Pivotal movement of the axle 16 causes pivotal movement of the arm 14 in directions indicated by two arrows 18 and 19.

At an outer end of the arm 14 is a suspension 21 of a known type. The suspension 21 has at its outer end a radially outwardly projecting tab 22. A magnetic read/write head or slider 26 is provided on the underside of the suspension 21. If the arm 14 is pivoted counterclockwise in the direction of the arrow 18 from the position shown in FIG. 1, the head 26 moves to a position in which it is closely adjacent the magnetic surface on the disk 12. Limited pivotal movement of the arm 14 in the directions of arrows 18 and 19 causes the head 26 to move along a path which extends approximately radially of the rotating disk 12, within a zone where the head remains closely adjacent the magnetic surface on the disk 12. In this operational mode, the magnetic head 26 can be used to electromagnetically write information to or read information from the magnetic surface on the disk 12, in a manner which is known in the art.

A stationary support 41 is provided near a peripheral edge of the disk 12. A ramp surface 42 is provided on the support 41, and includes several surface portions 46–53. In particular, in a direction from the surface portion 46 to the surface portion 53, the ramp surface 42 includes an upwardly inclined surface portion 46, a raised surface portion 47, a downwardly inclined surface portion 48, a lower surface portion 49, an upwardly inclined surface portion 50, a raised surface portion 51, a downwardly inclined surface portion 52, and a lower surface portion 53. A projection 55 is fixedly coupled to and projects horizontally outwardly from the support 41, at a location which is aligned with the raised surface portion 47. A pad 56 of a velvet material is provided on an upwardly facing surface of the projection 55.

A head cleaning mechanism in the disk drive 10 includes a rigid bar 61 which is fixedly secured to and projects horizontally outwardly from the support 41. A resilient flexible element 62 has one end fixedly secured to the outer end of the rigid bar 61, and has its other end fixedly secured to one end of a further rigid bar 63. The rigid bar 63 is oriented so that it is approximately perpendicular to the flexible element 62. A short cylindrical rod is secured to the outer end of the bar 63, so as to define a ridge or lip 64. A damping part 68 is fixedly secured to the flexible element 62 along most of the length thereof. In the disclosed embodiment, the damping part 68 is made of a viscoelastic polymer, and is fixedly bonded to the flexible element 62. However, the damping part 68 could alternatively be made of some other type of material. The damping part 68 is configured so that, if the element 62 is flexed, the resilience of element 62 and the damping effect of part 68 will cooperate to return the element 62 relatively slowly to its original position, without oscillation.

A textured cleaning pad 69 is fixedly secured to the rigid bar 63, at an end thereof nearest the flexible element 62. The cleaning pad 69 has an upwardly facing surface which is made of a textured ceramic material, a textured polymer, or a textured glass material. One suitable textured glass material is commercially available from Physical Optics Corporation of Torrance, Calif. as a 5° Sol-gel Holographic White Light Shaping Diffuser (LSD). As is known in the art, sol-gel is composed of silica suspended in a polymeric matrix. Heat treatment or hard ultraviolet exposure drives off most of the organic component, leaving a hard, glassy surface. Embossing of sol-gel is carried out under high pressure, and can produce features with heights up to several microns.

As an alternative, the textured surface could be created by chemically etching a glass material. The chemical etching can be carried out using solutions of various etchants, such as hydrofluoric acid and/or an etchant commercially available under the tradename ETCHALL from B & B Etching Products, Inc. of Sun City, Ariz.

With reference to FIG. 1, assume that the arm 14 is currently in a position in which it has been pivoted counterclockwise in the direction of arrow 18 from the position shown in FIG. 1, so that the head 26 is spaced from the ramp 42 and is closely adjacent the magnetic surface on the disk 12. Assume that the arm 14 is then rotated clockwise in the direction of arrow 19. During this pivotal movement of the arm 14, the tab 22 will engage and slide up the inclined surface portion 46, causing the suspension 21 and head 26 to be lifted upwardly, so that the head 26 moves away from the disk 12. The tab 22 will then slide across the raised surface portion 47. As this occurs, the lower side of the head 26 will slide across the velvet pad 56, and the velvet pad 56 will remove at least some of the contaminants that may be building up on the head 26, in order to help keep the head 26 clean. While the head 26 is engaging the velvet pad 56, the tab 22 may be lifted off the raised surface portion 47.

As the arm 14 continues to rotate, the tab 22 will slide down the inclined surface portion 48, until it is adjacent or engaging the lower surface portion 49. Pivotal movement of the arm 14 is normally stopped at this position, which is the position shown in FIG. 1, and which is commonly referred to as the park position of the head 26 and arm 14. The lower surface portion 49 and the two inclined surface portions 48 and 50 on either side of it collectively form a detent, and this detent tends to maintain the head 26 and arm 14 in the park position. In the park position, the head 26 is spaced from the disk 12, so that a mechanical shock will not cause the head 26 and disk 12 to forcibly engage each other in a manner that could cause physical damage to one or both.

At a subsequent point in time, the arm 14 can be rotated in the direction of arrow 18, and the sequence of events just described will occur in a reverse order. In particular, the tab 22 will slide up the inclined surface portion 48, across the raised surface portion 47, and down the inclined surface portion 46, so that the head 26 is again positioned adjacent to the rotating disk 12. As this occurs, and in particular as the tab 22 slides back across the raised surface portion 47, the head 26 will slide back across the velvet pad 56, thereby giving the pad 56 another opportunity to remove contaminants and thereby keep the head 26 clean.

Although the velvet pad 56 is very helpful in removing contaminants from the head 26, from time to time a more effective cleaning operation may be needed. In the disclosed embodiment, this is carried out in the following manner. Assuming that the head 26 and arm 14 have been moved to the park position of FIG. 1, the arm 14 is rotated clockwise in the direction of arrow 19, into a zone of movement where the further cleaning operation can be carried out on the head 26. As the arm 14 is rotated clockwise, the tab 22 to slides up the inclined surface portion 50 and across the raised surface portion 51, and then slides down the inclined surface portion 52 until it is disposed over the lower surface portion 53. As the tab slides down the inclined surface portion 52, the head 26 will be lowered into contact with the textured surface of the cleaning pad 69. As a result, the pad 22 does not actually move into engagement with the lower surface portion 53, but instead ends up being spaced slightly from it. As the arm 14 is carrying out this rotation in the direction of arrow 19, the arm 14 engages the lip 64 and moves the rigid bar 63, which causes the flexible element 62 to be resiliently flexed against the resistance of the damping part 68. This flexing of the resilient element 62 causes the cleaning pad 69 to be displaced in a direction approximately radially of the pivot axis for the arm 14. Next, two different forms of movement occur at the same time.

First, the arm 14 is rotated back in the direction of arrow 18 to a position in which the tab 22 is still over the lower surface portion 53 and the head 26 is approximately centered over the pad 69. The actuator controlling the arm 14 is then used to reciprocate the arm 14 several times in the directions of arrows 18 and 19, so as to thereby reciprocate the head 26 several times in relation to the pad 69 which it engages. Simultaneously, and since the damping part 68 limits the speed with which the flexible element 62 can return to its original position under its own resilience, the arm 14 moves out of engagement with the lip 64. The resilience of the flexible element 62 will slowly and progressively return the flexible element 62 to its original position against the damping effect of the damping part 68. As this occurs, the cleaning pad 69 moves relative to the head 26 in a direction approximately radially of the pivot 16, or in other words in a direction approximately perpendicular to the directions in which the head 26 is being reciprocated by the arm 14.

As these two independent components of movement are occurring, the textured surface of the cleaning pad 69 rubs against the head 26, and scrapes away contaminants that the velvet pad 56 was not able to remove. When the flexible element 62 eventually reaches its original position, such that the cleaning pad 69 is also in its original position, the arm 14 is pivoted in the direction of the arrow 18 until it reaches the park position shown in FIG. 1. As this occurs, the tab 22 slides up the inclined surface portion 52, across the raised surface portion 51, and down the inclined surface portion 50.

Figure 2:
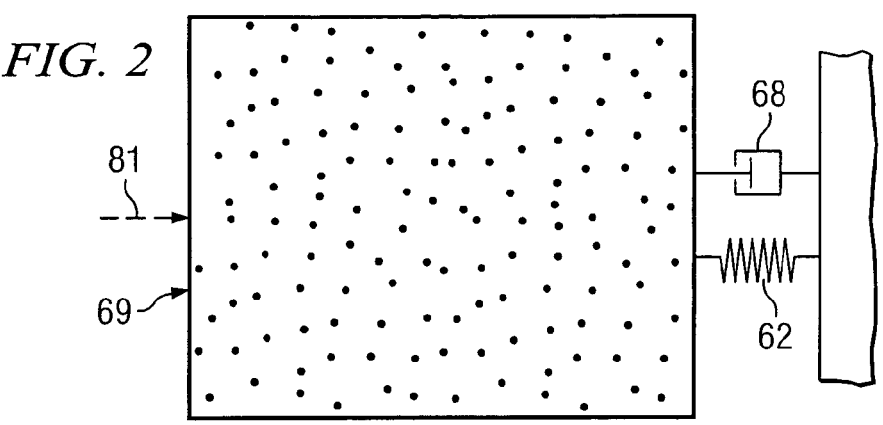
FIG. 2 is a diagrammatic view showing a cleaning pad, a flexible element and a damping part which are components of a head cleaning mechanism in the apparatus of FIG. 1.

The flexible element 62 and the damping part 68 effectively form an over-damped harmonic oscillator, which movably supports the cleaning pad 69. This relationship is shown diagrammatically in FIG. 2. In particular, engagement of the arm 14 with the lip 64 (FIG. 1) causes a load force 81 (FIG. 2) to be applied to the cleaning pad 69, thereby resiliently flexing the flexible element 62 against the resistance of the damping part 68. The load force 81 is then removed, and energy stored in the flexible element 62 returns the cleaning pad 69 to its original position, while the damping part 68 dissipates much of the energy stored in the flexible element. This over-damped arrangement permits precise control of the velocity and displacement of the cleaning pad.

Figure 3:
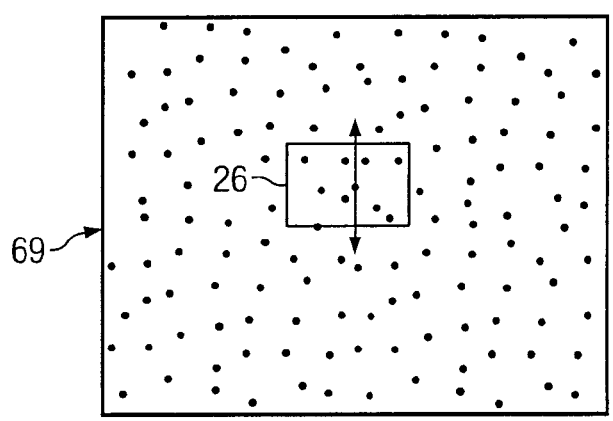
FIG. 3 is a diagrammatic view showing the cleaning pad, and showing a magnetic head which is a further component of the apparatus of FIG. 1.
Figure 4:
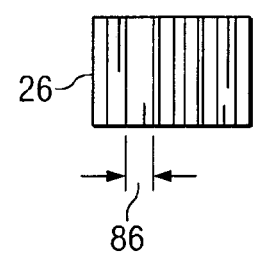
FIG. 4 is a diagrammatic view showing the magnetic head, and showing trace lines which represent paths of movement of asperities of the cleaning pad relative to the head during a head cleaning operation.

FIG. 3 is a diagrammatic view of the head 26 when it is engaging the textured cleaning pad 69. When the arm 14 reciprocates the head 26 in the direction of arrows 18 and 19 in FIG. 1, the head is reciprocated relative to the cleaning pad 69. Consequently, asperities of the cleaning surface on the pad 69 each move reciprocally in relation to the head 26, as indicated diagrammatically for one asperity by a double-headed arrow in FIG. 3. The asperities thus effectively trace lines on the head 26, as shown diagrammatically by the lines depicted on the head 26 in FIG. 4. If the head 26 is reciprocated or oscillated with an amplitude greater then half its width, some of the asperities should trace lines across the entire width of the head. The maximum distance 86 between these trace lines is indicated at 86 in FIG. 4, and represents the minimum distance that the cleaning pad needs to move during a head cleaning operation in order to ensure that the entire operational surface of the head 26 is subjected to a cleaning effect. The width of each line on the head 26 in FIG. 4 represents the diameter of the contact area between an asperity and the head 26, or in other words the width effectively cleaned by a single asperity during one stroke of the reciprocal movement. Using this diameter and the frequency at which the head is reciprocated, the maximum allowable velocity of the cleaning pad during the cleaning operation can be calculated.

Figure 5:
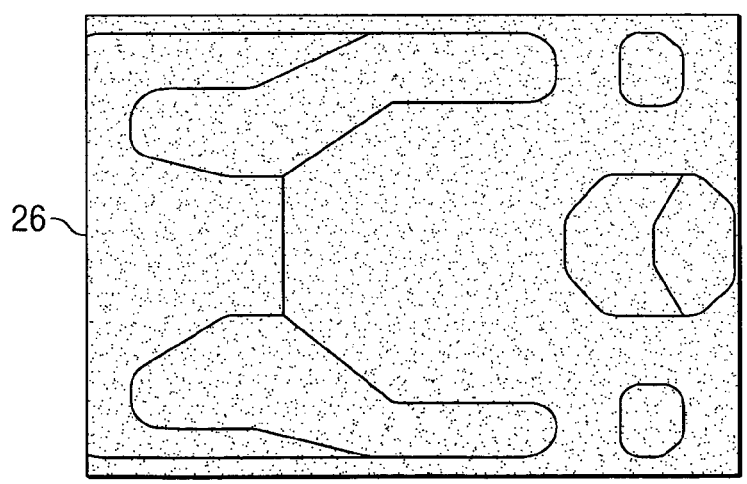
FIG. 5 is a view of a surface of the magnetic head with a coating which is a thin layer of gold.
Figure 6:
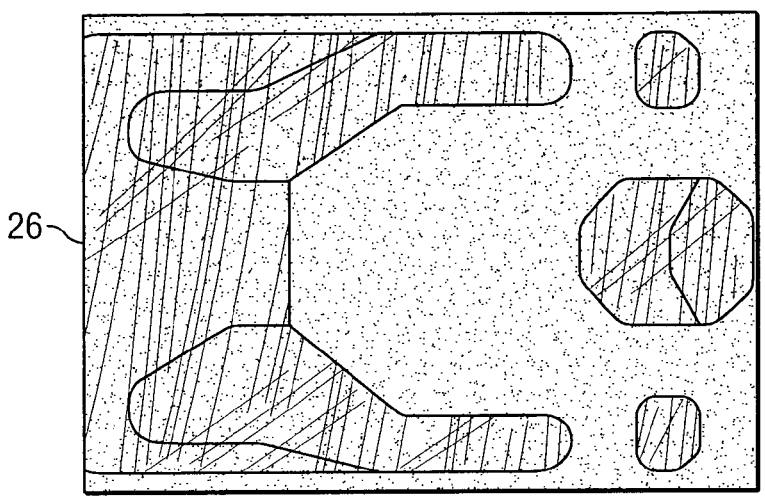
FIG. 6 is a view of the magnetic head of FIG. 5 after a cleaning operation, and shows trace lines produced in the gold layer by asperities of the cleaning pad during the head cleaning operation.

In order to empirically evaluate this, a thin layer of gold was sputtered onto the bottom surface of the head 26 of FIG. 1, and FIG. 5 is a view of the head 26 with the thin layer of gold thereon. A single cleaning operation was then carried out using apparatus of FIG. 1, in the manner described above. FIG. 6 is a view of the head 26 after this cleaning operation, and shows scratches in the gold which represent paths traced by asperities of the cleaning pad 69.

The distance between the scratches was measured to determine a maximum effective asperity-to-asperity spacing of $D_{a-a}=60\ \mu m$. The width of the scratches was measured to determine an asperity contact diameter value $\Phi_a=5\ \mu m$. Note that $D_{a-a}$ will depend on factors such as the cleaning pad texture, the air bearing surface (ABS) and shallow step geometry, and the amplitude of reciprocation. With $D_{a-a}$ and $\Phi_a$ known, and given a frequency of head reciprocation f, a necessary distance of cleaning pad motion $\Delta X$ during a head scrub and a maximum pad velocity $dx/dt_{max}$ can be specified as:

$$\Delta X > D_{a-a}$$

$$dx/dt_{max} < 2f\Phi_a$$

Figure 7:
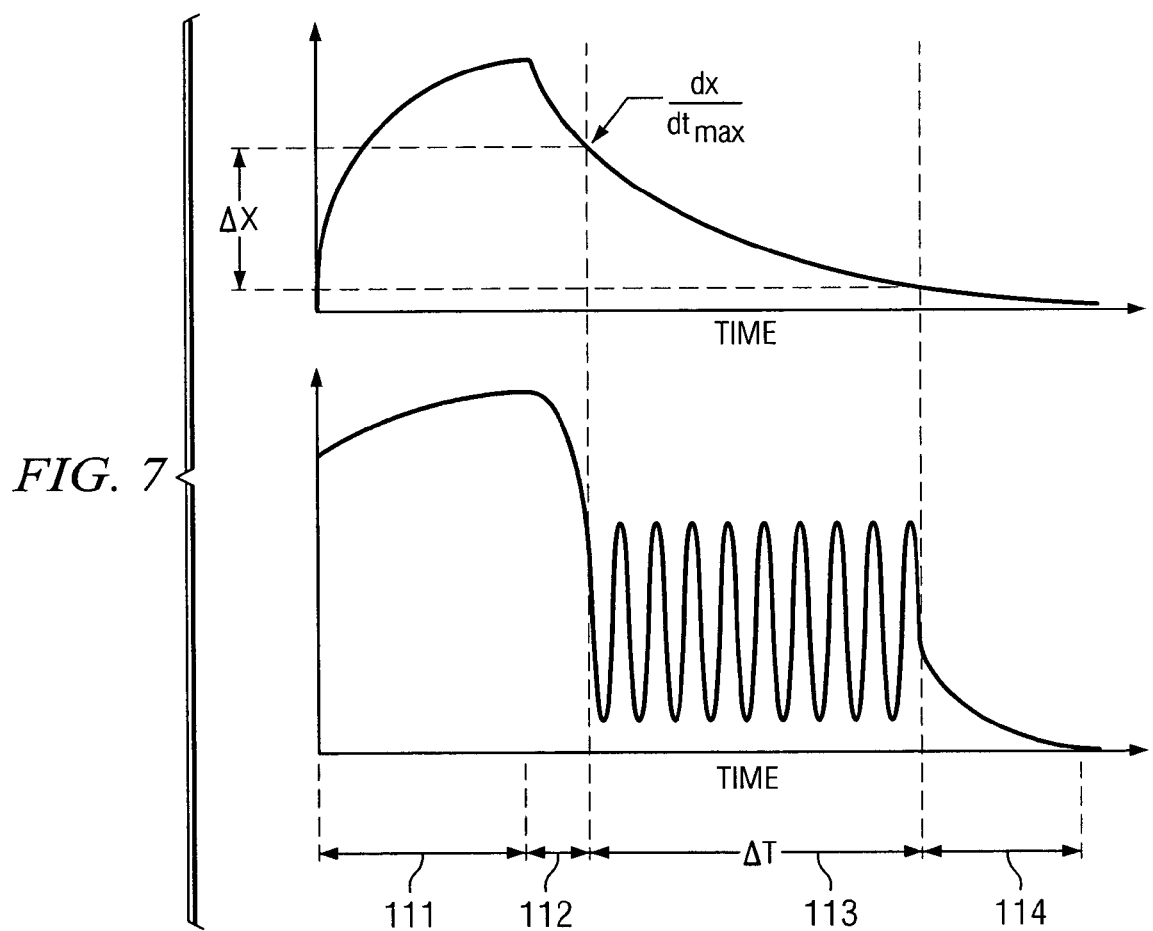
FIG. 7 is a graph showing two curves which respectively represent displacement of the cleaning pad and displacement of the magnetic head during a cleaning cycle.

FIG. 7 is a graph showing two curves which respectively represent the displacements during a cleaning cycle of the cleaning pad 69 (upper curve) and the head 26 (lower curve). In FIG. 7, time segment 111 corresponds to the movement of the arm 14 of FIG. 1 which effects flexing of the flexible element 62. Time segment 112 corresponds to the movement of arm 14 which positions the head 26 at a selected scrub location on the pad 69. Time segment 113 represents the actual cleaning operation, which has a duration $\Delta T$ corresponding to the time needed for the flexible element 62 to move the cleaning pad 69 through a distance $\Delta X$ against the damping effect of the damping part 68. Time segment 114 corresponds to the movement of arm 14 and head 26 from the scrub location back to the park position of FIG. 1 at the end of the cleaning operation.

In the embodiment of FIG. 1, and as discussed above, the damping part 68 is configured so that the flexible element 62 returns to its original position without oscillation. As an alternative, the damping element could be omitted, or configured to effect a lesser degree of damping, so that the flexible element 62 experiences some degree of resonant oscillation as it returns to its original position after being flexed. As a result, the cleaning pad 69 would be reciprocated or oscillated by the flexible element 62 in relation to the head 26 at the same time that the head 26 is being reciprocated or oscillated by the arm 14 relative to the cleaning pad 69, where these two different reciprocating movements occur in directions that are generally perpendicular to each other.

Figure 8:
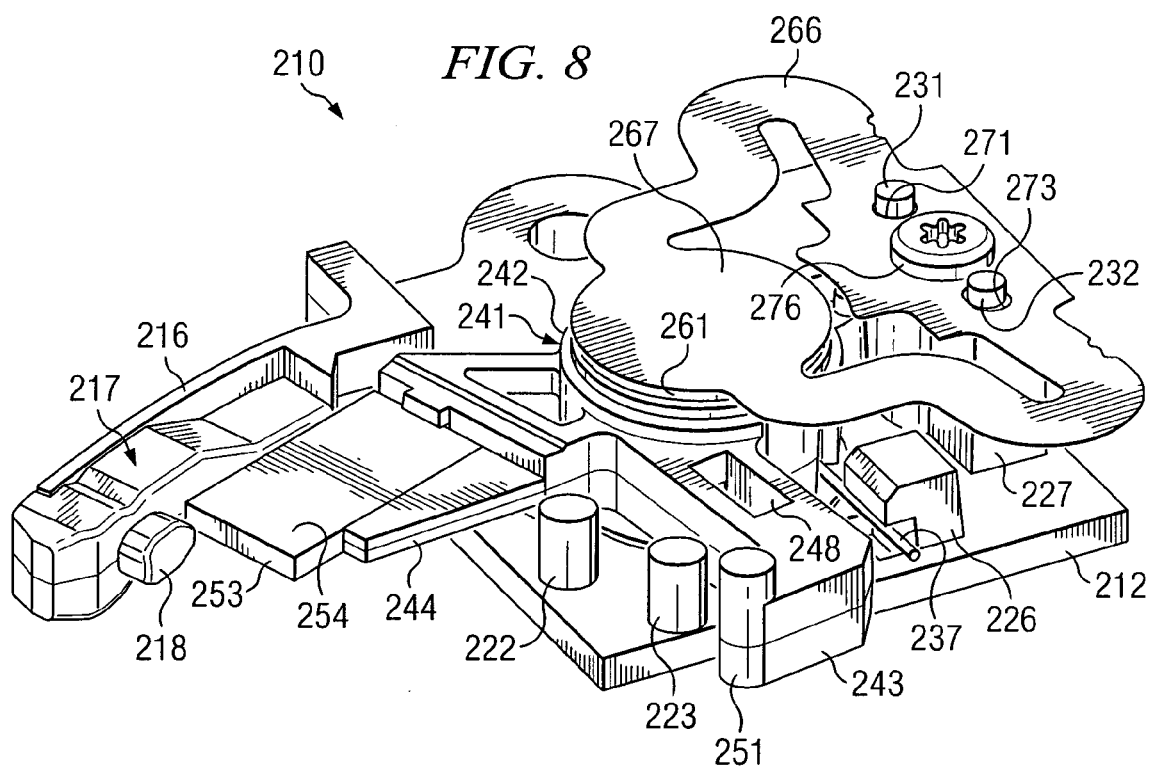
FIG. 8 is a diagrammatic perspective view of an apparatus in the form of a head cleaning mechanism, which is an alternative embodiment of the head cleaning mechanism in the apparatus of FIG. 1.
Figure 9:
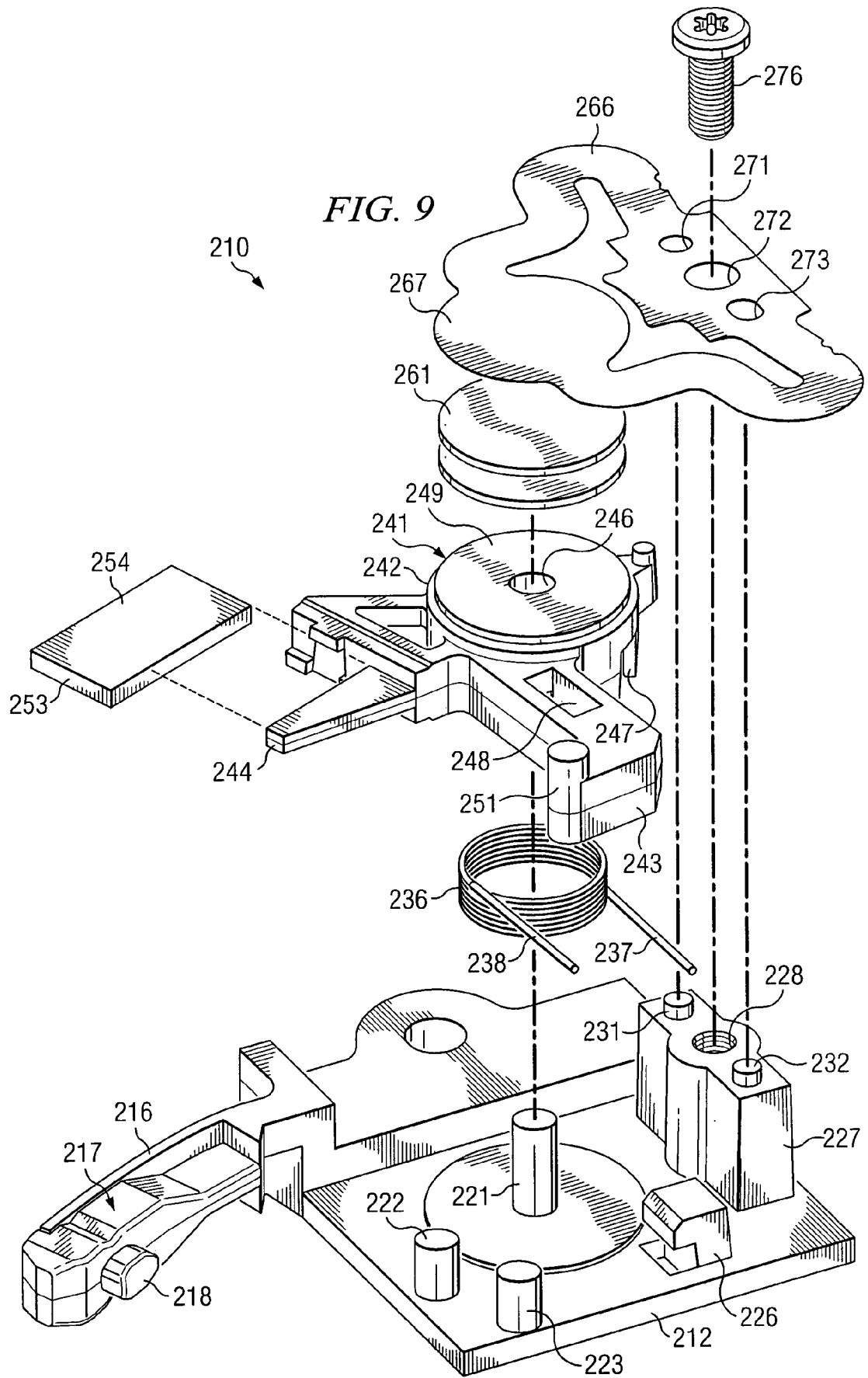
FIG. 9 is a diagrammatic perspective exploded view of the apparatus of FIG. 8.

FIG. 8 is a diagrammatic perspective view of an apparatus in the form of a head cleaning mechanism 210, which is an alternative embodiment of the head cleaning mechanism in the disk drive 10 of FIG. 1. FIG. 9 is a diagrammatic perspective exploded view of the head cleaning mechanism 210 of FIG. 8. The head cleaning mechanism 210 includes a base 212, which is made of a durable plastic but could alternatively be made of any other suitable material. The base 212 has an outwardly projecting arm 216, and the arm 216 has thereon a ramp surface 217, which is similar in structure and function to the ramp surface shown at 42 in FIG. 1.

The arm 216 also has a boss 218 that serves as a limiter. When the arm 14 and head 26 (FIG. 1) are disposed in their park position, the suspension 21 for the head 26 is aligned with the limiter 218. In the event of a mechanical shock, for example if the disk drive is dropped, the limiter 218 engages a portion of the head suspension 21, in a manner that protects the head 26 from damage. Further, in embodiments where the suspension 21 supports several heads 26 the arm 14, the cooperation between the limiter 218 and the suspension 21 helps prevent the heads from hitting each other and sustaining damage.

As best seen in FIG. 9, the base 212 has an upwardly projecting cylindrical pivot axle 221, and has two upwardly projecting cylindrical stops 222 and 223, which are each spaced radially outwardly from the pivot axle 221. A spring catch 226 is provided on the base 212 at a location which is spaced radially outwardly in a different direction from the pivot axle 221. The base 212 also has an upwardly extending projection 227. A threaded hole 228 extends vertically downwardly into the projection 227 from the center of the top surface thereof. Two short cylindrical studs 231 and 232 each project upwardly from the top surface of the projection 227, on opposite sides of the threaded hole 228.

A coil spring 236 encircles the pivot axle 221, and has two outwardly projecting legs 237 and 238. The leg 237 engages the spring catch 226. The spring 236 is made of metal, but could alternatively be made from some other suitable material.

A pivot lever 241 has an approximately circular hub 242, and has two arms 243 and 244 projecting horizontally outwardly from the hub 242 in respective directions which are approximately radial, and which are approximately perpendicular to each other. The hub 242 has a central opening 246 extending vertically through it, and this opening 246 rotatably receives the pivot axle 221. In the embodiment of FIGS. 8-9, the lever is made of a durable plastic, but it could alternatively be made of any other suitable material.

The hub 242 has in the underside thereof an annular recess which is not visible in the drawings, and which receives the coil of the spring 236. The hub 242 has through one side wall thereof a vertical slot 247, through which the leg 237 of the spring 236 extends outwardly to the spring catch 226. The leg 243 of the lever 241 has a further spring catch 248, which cooperates with the leg 238 of the spring 236. The spring 236 urges the lever 241 to pivot clockwise in FIGS. 8-9. The stop 223 engages the arm 243 in order to limit clockwise pivotal movement of the lever 241 under the urging of the spring 236. The stop 222 engages the arm 244 in order to limit counterclockwise pivotal movement of the lever 241.

The hub 242 has a planar circular surface 249 on the upper side thereof, for a purpose which is discussed later. A ridge or lip 251 is provided at the outer end of the arm 243. When the arm 14 and head 26 (FIG. 1) are moved past their park position, the arm 14 engages the ridge or lip 251, and pivots the lever 241 counterclockwise against the urging of the spring 236.

A rectangular cleaning pad 253 is fixedly secured in any suitable manner to the arm 244 of the pivot lever 241, for example through use of a known epoxy adhesive. In the disclosed embodiment, the cleaning pad 253 is a light shaping diffuser part obtained commercially under catalog number LSD10/10PC30-2 from Physical Optics Corporation of Torrance, Calif. Although this particular part is commercially marketed as an optical component, it is used here for its mechanical structure and not its optical characteristics.

More specifically, the cleaning pad 253 has a center substrate made from a polycarbonate material or an acrylic material, and has an ultraviolet curing epoxy spread on each of the top and bottom surfaces of the substrate. Before the epoxy is cured, it is embossed with a desired texture (such as a 10° diffusion pattern), and then is cured using ultraviolet light. Although the embodiment of FIGS. 8-9 uses this particular structural part, it would alternatively be possible to use some other suitable part. The cleaning pad 253 has on the top side thereof an upwardly-facing cleaning surface 254, which is functionally comparable to the cleaning surface provided on top of the cleaning pad 69 in the embodiment of FIG. 1.

A disk-like damping part 261 is disposed concentrically above the pivot axle 221, and cooperates with the upwardly-facing surface 249 on the hub 242. A metal retaining plate 266 has an approximately circular portion 267 that cooperates with the top of the damping part 261, and has a further portion with three holes 271–273 that engages the top of the projection 227. The holes 271 and 273 respectively receive the studs 231 and 232 on the projection 227, and the opening 272 is aligned with the threaded hole 228 in the projection 227. A screw or bolt 276 fixedly secures the retaining plate 266 to the projection 227. In particular, the bolt 276 has a head which engages the top surface of the plate 166, and has a threaded shank which extends through the opening 272 and threadly engages the threaded hole 228.

The damping part 261 has alternating layers of a polyester material and a pressure sensitive adhesive. In the embodiment of FIGS. 8–9, the pressure sensitive adhesive is obtained commercially under catalog number ECA-172 from Entrotech, Inc. of Columbus, Ohio. However, it would alternatively be possible to use any other suitable material. The top and bottom surfaces of the damping part 261 are layers of the pressure sensitive adhesive, and respectively engage the underside of the portion 267 of the retaining plate 266, and the top surface 249 on the hub 242 of lever 241. The damping part 261 yieldably resists pivotal movement of the lever 241 with respect to the retaining plate 266. This resistance is due primarily to the fact that pivotal movement of the lever 241 causes shear forces within the pressure sensitive adhesive layers, and the pressure sensitive adhesive yieldably resists internal movement that relieves these shear forces.

The cleaning mechanism 210 of FIGS. 8 and 9 operates in a manner which is similar to the operation of the cleaning mechanism in the embodiment of FIG. 1, and its operation is therefore described only briefly here. In particular, when the read/write head 26 and its support arm 14 (FIG. 1) are pivoted beyond their park position, the support arm 14 engages the ridge or lip 251 on the lever arm 243, and pivots the lever 241 counterclockwise against the force of spring 236 and the resistance of damping part 261. The arm 14 then returns to a position in which the head 26 is in contact with the surface 254 on the cleaning pad 253, and the arm 14 then oscillates the head 26 several times. As this occurs, the spring 236 is slowly returning the lever 241 to its original position, while the damping part 261 yieldably resists this pivotal movement, so that this pivotal movement occurs more slowly than would otherwise be the case. After the arm 14 has oscillated the head 26 on the cleaning surface 254, the arm 14 returns the head 26 to its park position, while the lever 241 is still being returned to its original position by the spring 236.

The present invention provides a number of advantages. One such advantage is realized where cleaning of the head occurs by placing the head in engagement with a cleaning part and by then effecting relative movement of the head and cleaning part in a manner which includes a component of movement that is representative of an applied force subject to a damping influence. In one particular configuration, the applied force includes a harmonic oscillation, and the damping influence includes overdamping of the harmonic oscillation. This damped-force approach permits precise control over both the velocity and displacement of the cleaning part. A related advantage is that, through effective cleaning of the head with this technique, it becomes practical to implement a relatively high storage density on a hard disk of a removable cartridge, even where the read/write head is in the drive, and without a significant need to seal the cartridge.

Although a selected embodiment has been illustrated and described in detail, it will be understood that various substitutions and alterations can be made therein without departing from the spirit and scope of the present invention, as defined by the following claims.

What is claimed is:

1. An apparatus, comprising:
   an information storage medium having an information storage surface;
   structure which includes a head and can effect a transfer of information with respect to said surface, said structure being operable to move the head through first and second zones which are mutually exclusive, said structure being operable to move said head within said first zone while maintaining said head adjacent said surface and using said head to effect at least one of roading information from and writing information to said surface, and wherein said head is spaced from said surface when in said second zone; and
   a head cleaning section which includes a cleaning part engageable with said head when said head is in said second zone, said structure being operable to effect relative movement of said head and said cleaning part white said head and said cleaning part are engaged, in a manner which includes a component of movement representative of an applied force subject to a damping influence.

2. An apparatus according to claim 1, wherein said applied force includes a harmonic oscillation and said damping influence includes an overdarnping of said harmonic oscillation.

3. An apparatus according to claim 1,
   wherein said applied force and said damping influence are each effective with an orientation approximately parallel to a predetermined direction; and
   wherein said relative movement of said head and said cleaning part while said head and said cleaning part are engaged includes a further component of movement effective with an orientation approximately parallel to a further direction which is transverse to said predetermined direction.

4. An apparatus according to claim 3, wherein one of said components of movement involves a reciprocating motion and the other thereof involves progressive motion in one direction during said reciprocating motion.

5. An apparatus according to claim 3, wherein said further component of movement includes a reciprocating motion of said head relative to said cleaning part.

6. An apparatus according to claim 3. wherein said applied force includes a harmonic oscillation, and said damping influence includes an overdamping of said harmonic oscillation.

7. An apparatus according to claim 1, wherein said head cleaning section includes a first portion which can apply said applied force to said cleaning part in a predetermined direction, and a second portion which exerts said damping influence on said cleaning part approximately parallel to said predetermined direction.

8. An apparatus according to claim 7, wherein said first portion includes a resilient part which yieldably resists movement of said cleaning part away from a predetermined position in a direction approximately parallel to said predetermined direction.

9. An apparatus according to claim 8,
   wherein said resilient part is a flexible part having said cleaning part supported thereon;
   wherein said second portion includes a damping part which is physically coupled to said flexible part and damps flexing of said flexible part;
   wherein said structure includes a movably supported member which has said head supported thereon;
   wherein said structure is configured to effect movement said member so that said head moves within said second zone form a first position to a second position and then back to said first position; and
   wherein in response to movement of said head by said member from said first position to said second position, said cleaning part is moved away from said predetermined position through flexing of said flexible part, and said cleaning part and said flexible part are free of influence from said head and said member as said head returns from said second position to said first position.

10. An apparatus according to claim 9,
    wherein said head cleaning section includes an element mounted on said flexible part;
    wherein as said member moves said head from said first position to said second position said member engages said element and moves said element in a manner that flexes said flexible part and moves said cleaning part away from said predetermined position; and
    wherein as said member moves said head from said second position to said first position said member is free of engagement with said element.

11. An apparatus according to claim 9, wherein said movement of said head from said second position to said first position includes, at a location between said first and second positions, a reciprocal motion of said head in directions approximately parallel to a direction of movement thereof between said first and second positions.

12. An apparatus according to claim 8,
    wherein said head cleaning section includes a pivotally supported lever having said cleaning part thereon;

wherein said resilient part is a spring which yieldably urges said lever to pivot in a predetermined direction;

wherein said second portion includes a damping part which is cooperable with said lever for yieldably resisting pivotal movement thereof;

wherein said structure includes a movably supported member which has said head supported thereon;

wherein said structure is configured to effect movement said member so that said head moves within said second zone from a first position to a second position and then back to said first position; and wherein in rosponse to movement of said head by said member from said first position to said second position, said cleaning part is moved away from said predetermined position through pivotal movement of said lever against the urging of said spring, and said cleaning part and said spring are free of influence from said head and said member as said head returns from said second position to said first position.

13. An apparatus according to claim 12, wherein said second portion includes a damping part which cooperates with said lever and with a stationary part, and which has alternating layers of a polyester material and a pressure sensitive adhesive, said pressure sensitive adhesive yieldably resisting shear farces within said pressure sensitive adhesive so as to provide said damping influence.

14. An apparatus according to claim 12,
wherein as said member moves said head from said first position to said second position said member engages said lever and pivots said lever against the urging of said spring; and
wherein as said member moves said head from said second position to said first position said member is free of engagement with said lever.

15. An apparatus according to claim 12, wherein said movement of said head from said second position to said first position includes, at a location between said first and second positions, a reciprocal motion of said head in directions approximately parallel to a direction of movement thereof between said first and second positions.

16. An apparatus according to claim 1, wherein said cleaning part has a textured surface, and said engagement of said head and said cleaning part involves engagement of said head with said textured surface.

17. An apparatus according to claim 16, wherein said cleaning part has a portion which is made of sol-gel and which has said textured surface thereon.

18. An apparatus according to claim 16, wherein said cleaning part has a portion which is made of an epoxy material and which has said textured surface thereon.

19. An apparatus according to claim 1,
wherein said information storage medium includes a magnetic material which has said information storage surface thereon; and
wherein said head is a magnetic read/write head.

20. A method of operating an apparatus which includes an information storage medium having an information storage surface, structure which includes a head and can effect a transfer of information with respect to said surface, and a cleaning part, said method comprising:

moving said head through including first and second zones which are mutually exclusive, said head being spaced from said surface when in said second zone;

maintaining said head adjacent said surface and using said head to effect at least one of reading information from and writing information to said surface during relative movement of said head and said surface within said first zone;

causing said cleaning part to engage said head when said head is in said second zone while effecting relative movement of said head and said cleaning part in a manner which includes a component of movement representative of an applied force subject to a damping influence.

21. A method according to claim 20, including:
configuring said applied force to include a harmonic oscillation; and
configuring said damping influence to include an overdamping of said harmonic oscillation.

22. A method according to claim 20, including;
orienting said applied force and said damping influence to each be effective approximately parallel to a predetermined direction; and
causing said relative movement of said head and said cleaning part while said head and said cleaning part are engaged to include a further component of movement effective with an orientation approximately parallel to a further direction which is transverse to said predetermined direction.

23. A method according to claim 22, including configuring one of said components of movement to involve a reciprocating motion, and configuring the other thereof to involve progressive motion in one diredion during said reciprocating motion.

24. A method according to claim 22, including configuring said further component of movement to include a reciprocating motion of said head relative to said cleaning part.

25. A method according to claim 22, including:
configuring said applied force to include a harmonic oscillation; and
configuring said damping influence to include an overdamping of said harmonic oscillation.

26. A method according to claim 20, including configuring said cleaning part to have a portion which is made of sol-gel and which has thereon a textured surface, said engagement of said head and said cleaning part involving engagement of said head with said textured surface.

27. A method according to claim 20, including configuring said cleaning part to have a portion which is made of an epoxy material and which has thereon a textured surface, said engagement of said head and said cleaning part involving engagement of said head with said textured surface.

28. A method according to claim 20, including configuring said information storage medium to include a magnetic material which has said information storage surface thereon, said head being a magnetic read/write head.

* * * * *